(12) United States Patent
Gupta et al.

(10) Patent No.: US 9,088,630 B2
(45) Date of Patent: Jul. 21, 2015

(54) SELECTIVELY MIXING MEDIA DURING A GROUP COMMUNICATION SESSION WITHIN A WIRELESS COMMUNICATIONS SYSTEM

(75) Inventors: Abhishek Gupta, San Diego, CA (US); Arvind V. Santhanam, San Diego, CA (US); Vidyadhar Kamath, San Diego, CA (US); Rajan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 12/832,779

(22) Filed: Jul. 8, 2010

(65) Prior Publication Data

US 2011/0167104 A1    Jul. 7, 2011

Related U.S. Application Data

(60) Provisional application No. 61/225,130, filed on Jul. 13, 2009.

(51) Int. Cl.
*G06F 15/16* (2006.01)
*H04L 29/06* (2006.01)

(52) U.S. Cl.
CPC ........ *H04L 65/4061* (2013.01); *H04L 65/1089* (2013.01); *H04L 65/605* (2013.01); *H04L 65/80* (2013.01)

(58) Field of Classification Search
CPC ............ H04L 65/4061; H04L 65/1089; H04L 65/605; H04L 65/80
USPC .......................................................... 709/203
See application file for complete search history.

(56) References Cited

U.S. PATENT DOCUMENTS 5,881,053 A * 3/1999 Kimball .......................... 370/260
6,085,223 A * 7/2000 Carino et al. .................. 709/203

(Continued)

FOREIGN PATENT DOCUMENTS

CN    1148939 C    5/2004
CN    1871825 A    11/2006

(Continued)

OTHER PUBLICATIONS

International Search Report—PCT/US2010/041874, International Search Authority—European Patent Office—Nov. 11, 2010.

(Continued)

*Primary Examiner* — Razu Miah
(74) *Attorney, Agent, or Firm* — Raphael Freiwirth

(57) ABSTRACT

Embodiments are directed selectively mixing media at an application server arbitrating a group communication session for a communication group. In an embodiment, the application server receives media, from one or more session participants of the group communication session, for transmission to the communication group. The application server determines a number of session participants that are providing the received media. The application server determines whether to bypass the received media from entry into a de-jitter buffer based at least in part on the determined number, wherein the de-jitter buffer is configured to queue media from session participants for mixing by the application server during the group communication session. For example, the application server can determine to bypass the received media from entry into the de-jitter buffer if the number is below a threshold number. The application server transmits the received media to the communication group.

16 Claims, 12 Drawing Sheets

(56) References Cited

U.S. PATENT DOCUMENTS

| | | | |
|---|---|---|---|
| 6,125,343 A | 9/2000 | Schuster | |
| 6,697,342 B1 | 2/2004 | Smyth et al. | |
| 6,707,826 B1 | 3/2004 | Gorday et al. | |
| 6,728,222 B1 | 4/2004 | Ono | |
| 7,454,460 B2* | 11/2008 | Ivashin | 709/203 |
| 7,742,587 B2* | 6/2010 | Cohen | 379/202.01 |
| 7,908,320 B2* | 3/2011 | Ludwig et al. | 709/204 |
| 2001/0008533 A1* | 7/2001 | Umayabashi | 370/468 |
| 2002/0116472 A1* | 8/2002 | Kalish et al. | 709/218 |
| 2002/0118650 A1 | 8/2002 | Jagadeesan et al. | |
| 2002/0119795 A1 | 8/2002 | Dorenbosch | |
| 2003/0120795 A1 | 6/2003 | Reinshmidt | |
| 2004/0008635 A1* | 1/2004 | Nelson et al. | 370/260 |
| 2004/0039784 A1* | 2/2004 | Jacobs et al. | 709/206 |
| 2004/0054588 A1* | 3/2004 | Jacobs et al. | 705/14 |
| 2005/0005020 A1* | 1/2005 | Rey et al. | 709/231 |
| 2006/0034340 A1 | 2/2006 | Rong et al. | |
| 2006/0067287 A1* | 3/2006 | Kim et al. | 370/338 |
| 2006/0120404 A1 | 6/2006 | Sebire et al. | |
| 2006/0143308 A1* | 6/2006 | Cazzolla et al. | 709/248 |
| 2006/0146735 A1* | 7/2006 | Shaffer et al. | 370/260 |
| 2006/0195545 A1* | 8/2006 | Kikkawa et al. | 709/217 |
| 2007/0104105 A1* | 5/2007 | MeLampy et al. | 370/235 |
| 2007/0121597 A1 | 5/2007 | Lee et al. | |
| 2007/0195735 A1* | 8/2007 | Rosen et al. | 370/335 |
| 2007/0198704 A1* | 8/2007 | Huh | 709/224 |
| 2007/0266075 A1* | 11/2007 | Jachner | 709/203 |
| 2008/0037750 A1* | 2/2008 | Shaffer et al. | 379/202.01 |
| 2008/0092182 A1* | 4/2008 | Conant | 725/109 |
| 2008/0165707 A1 | 7/2008 | Baird et al. | |
| 2008/0268770 A1* | 10/2008 | Ashbrook et al. | 455/3.01 |
| 2009/0109879 A1* | 4/2009 | Kuusinen et al. | 370/260 |
| 2009/0248402 A1 | 10/2009 | Ito et al. | |
| 2009/0285175 A1* | 11/2009 | Nix | 370/331 |
| 2010/0074277 A1 | 3/2010 | Nishibayashi et al. | |
| 2010/0099420 A1* | 4/2010 | Chowdhary et al. | 455/450 |
| 2010/0169495 A1* | 7/2010 | Zhang et al. | 709/227 |
| 2010/0239078 A1* | 9/2010 | Sweeney et al. | 379/101.01 |
| 2010/0250753 A1* | 9/2010 | Song et al. | 709/227 |
| 2010/0265834 A1* | 10/2010 | Michaelis et al. | 370/252 |
| 2011/0141929 A1* | 6/2011 | Razdan et al. | 370/252 |

FOREIGN PATENT DOCUMENTS

| | | |
|---|---|---|
| EP | 2068544 A1 | 6/2009 |
| JP | S62133853 A | 6/1987 |
| JP | H03289252 A | 12/1991 |
| JP | 5037655 A | 2/1993 |
| JP | H06261316 A | 9/1994 |
| JP | 7095300 A | 4/1995 |
| JP | 8149439 A | 6/1996 |
| JP | H08307456 A | 11/1996 |
| JP | 2000174909 A | 6/2000 |
| JP | 2001500693 A | 1/2001 |
| JP | 2001044946 A | 2/2001 |
| JP | 2001516890 A | 10/2001 |
| JP | 2008079024 A | 4/2008 |
| KR | 20090035728 A | 4/2009 |
| WO | 9811709 A2 | 3/1998 |
| WO | 9913589 A1 | 3/1999 |
| WO | 2007101043 | 9/2007 |
| WO | 2008026754 A1 | 3/2008 |
| WO | WO2008147272 A1 | 12/2008 |

OTHER PUBLICATIONS

Written Opinion—PCT/US2010/041874—ISA/EPO—Nov. 11, 2010.

* cited by examiner

SELECTIVELY MIXING MEDIA DURING A GROUP COMMUNICATION SESSION WITHIN A WIRELESS COMMUNICATIONS SYSTEM

STATEMENT OF PRIORITY UNDER 35 U.S.C. §119

The present application for patent claims priority to Provisional Application No. 61/225,130, entitled "SELECTIVELY MIXING MEDIA DURING A GROUP COMMUNICATION SESSION WITHIN A WIRELESS COMMUNICATIONS SYSTEM", filed Jul. 13, 2009, assigned to the assignee hereof and hereby expressly incorporated by reference herein in its entirety.

REFERENCE TO CO-PENDING APPLICATIONS FOR PATENT

The present application for patent is related to the following co-pending U.S. patent applications:

Provisional Application No. 61/224,797 entitled "Media Forwarding For a Group Communication Session In A Wireless Communications System" filed Jul. 10, 2009, and assigned to the assignee hereof and hereby expressly incorporated by reference herein.

BACKGROUND OF THE INVENTION

1. Field of the Invention

Embodiments of the present invention are directed to selectively mixing media during a group communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments are directed selectively mixing media at an application server arbitrating a group communication session for a communication group. In an embodiment, the application server receives media, from one or more session participants of the group communication session, for transmission to the communication group. The application server determines a number of session participants that are providing the received media. The application server determines whether to bypass the received media from entry into a de-jitter buffer based at least in part on the determined number, wherein the de-jitter buffer is configured to queue media from session participants for mixing by the application server during the group communication session. For example, the application server can determine to bypass the received media from entry into the de-jitter buffer if the number is below a threshold number. The application server transmits the received media to the communication group.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
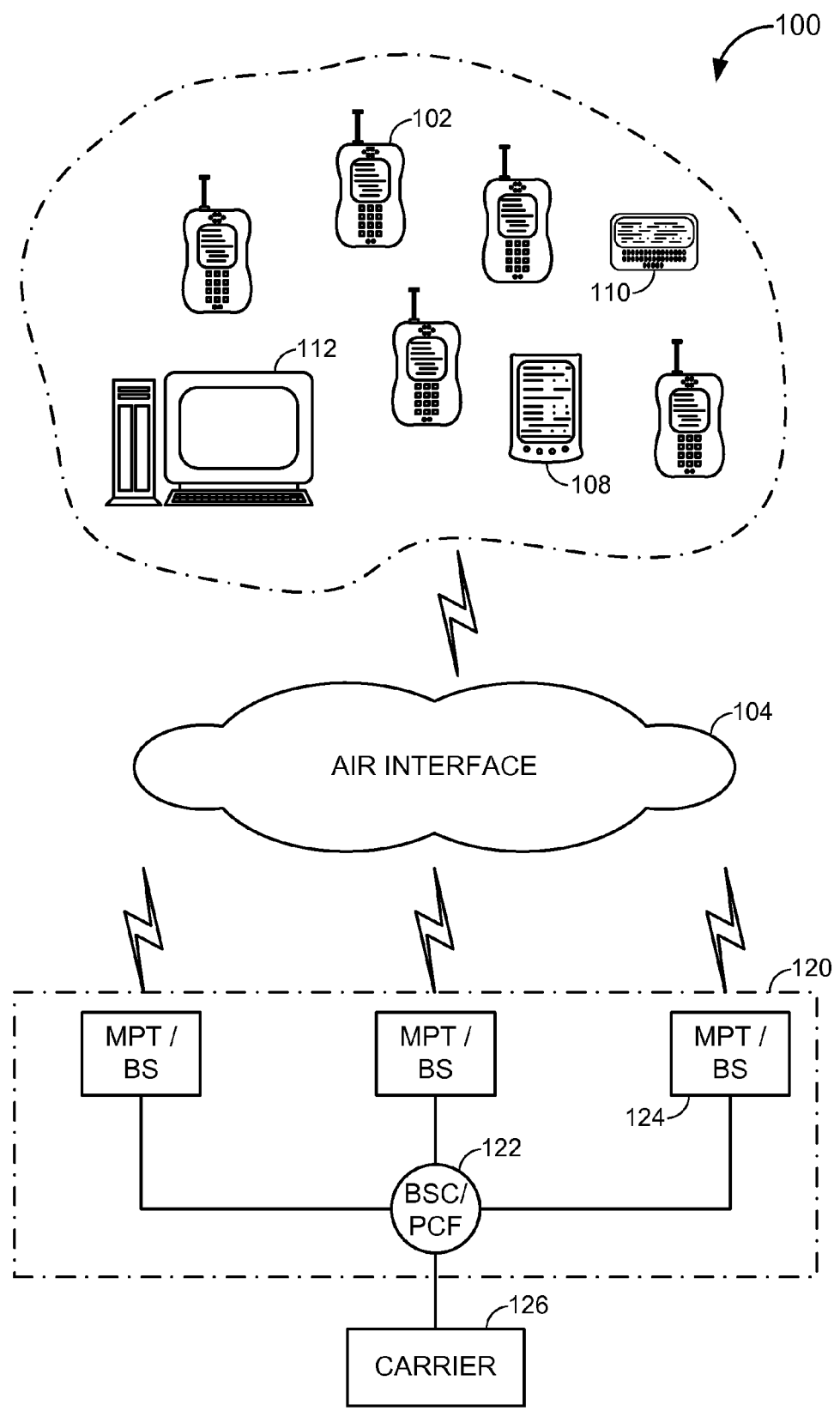
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
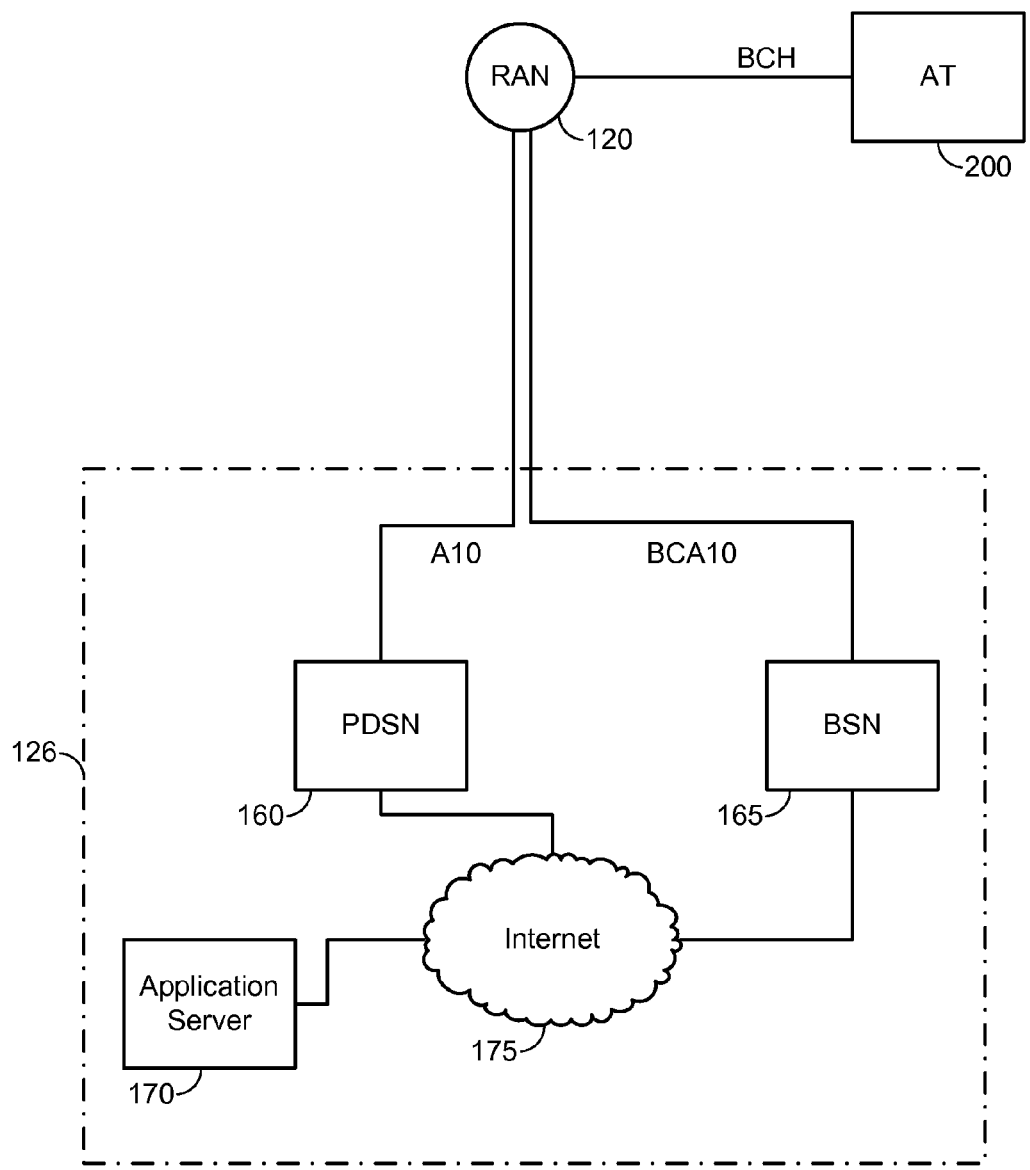
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
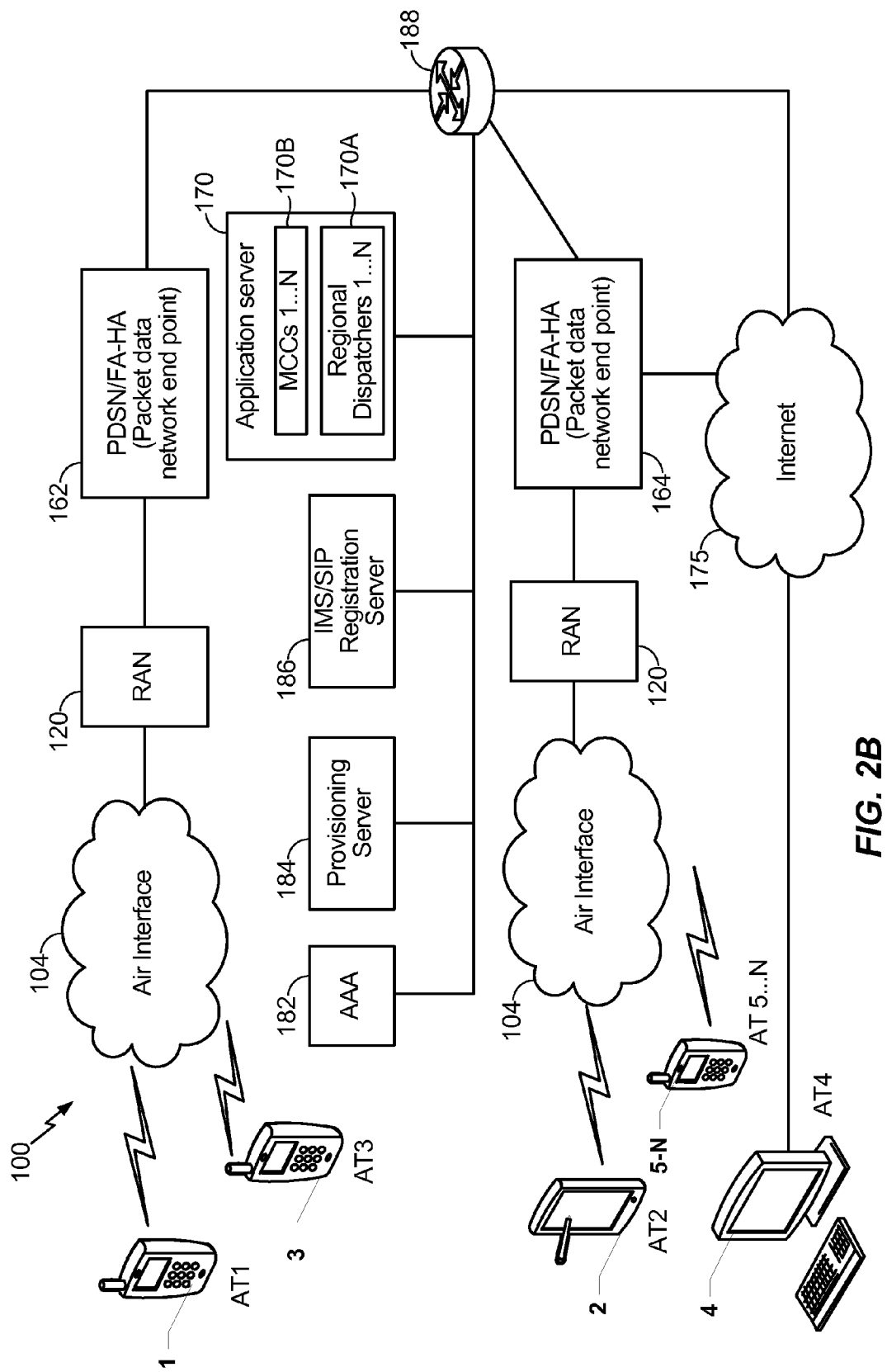
FIG. 2B illustrates an example of the wireless communication of FIG. 1 in more detail in accordance with at least one embodiment of the invention.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 2C:
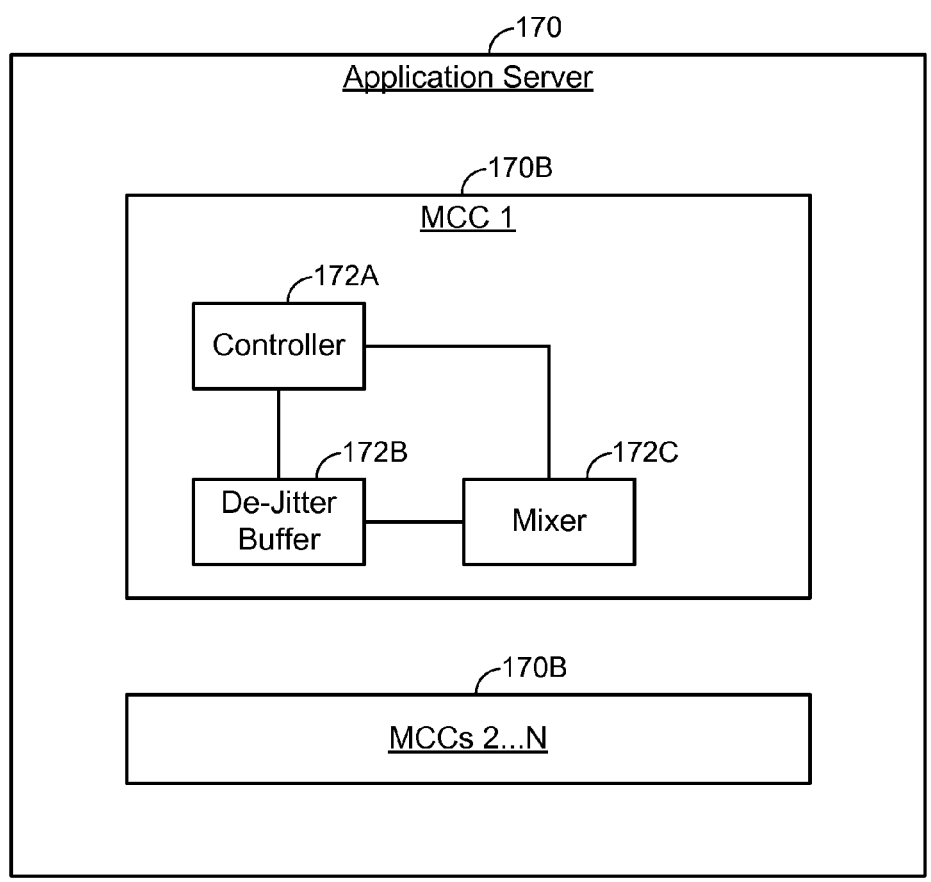
FIG. 2C illustrates an application server in accordance with an embodiment of the invention.

FIG. 2C illustrates the application server 170 in accordance with an embodiment of the invention. As shown in FIG. 2C, the application server 170 includes MCCs 1 . . . N, 170B, as in FIG. 2B. FIG. 2C shows the components of one of the MCCs 170B ("MCC 1") in more detail. Thus, MCC 1 in FIG. 2C is shown as including a controller 172A, a de-jitter buffer 172B and a mixer 172C. Generally, the controller 172A controls higher-level operations of the MCC 1, the de-jitter buffer 172B is responsible for queuing frames that are going to be mixed by the mixer 172C, and the mixer 172C is responsible for the actual mixing of the media frames from different ATs, or formatting a single input-frame into a format compatible with an output-stream transmitted from the MCC 170B to the communication group. Collectively, the components of the MCC 1 function to receive frames from one or more participants in a group communication session, and to forward the appropriate output stream to each session participant. Generally, this means combining or 'mixing' each frame received at the MCC 1 from the various session participants, and then forwarding the mixed version to the session participants. As will be appreciated, the mixer 172C can also cancel or remove each target's own input stream from the output stream forwarded to the same target so that a given user's speech is not re-transmitted back to him/her. The functionality of the MCC 1 and its respective components will be described in further detail below with respect to embodiments of the invention.

Figure 3:
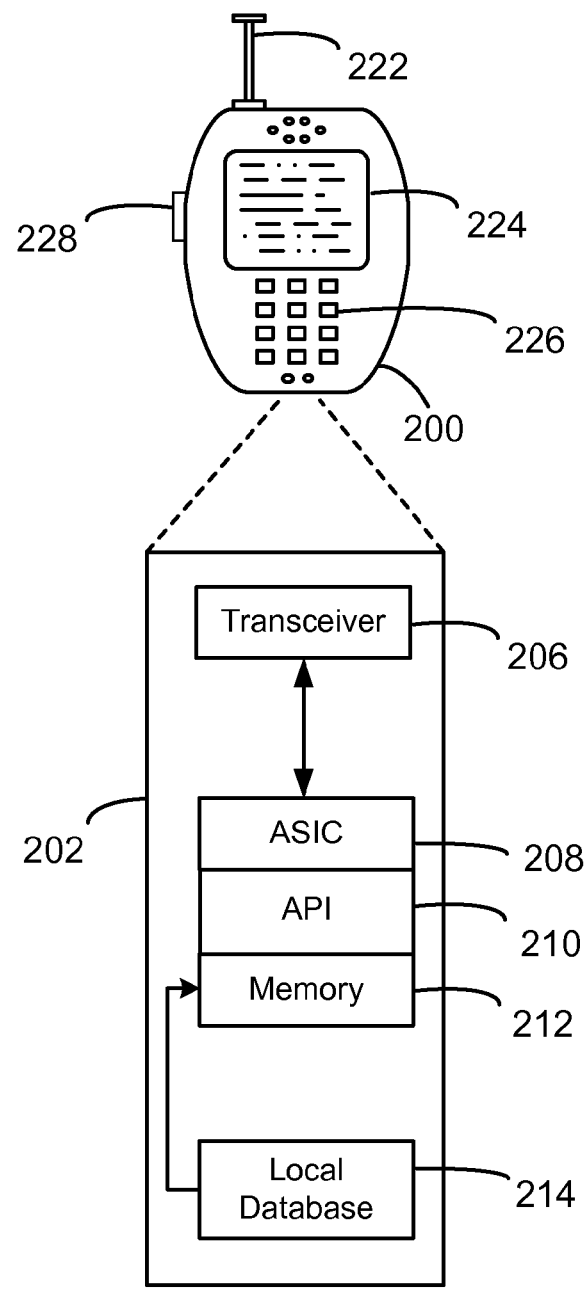
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4A:
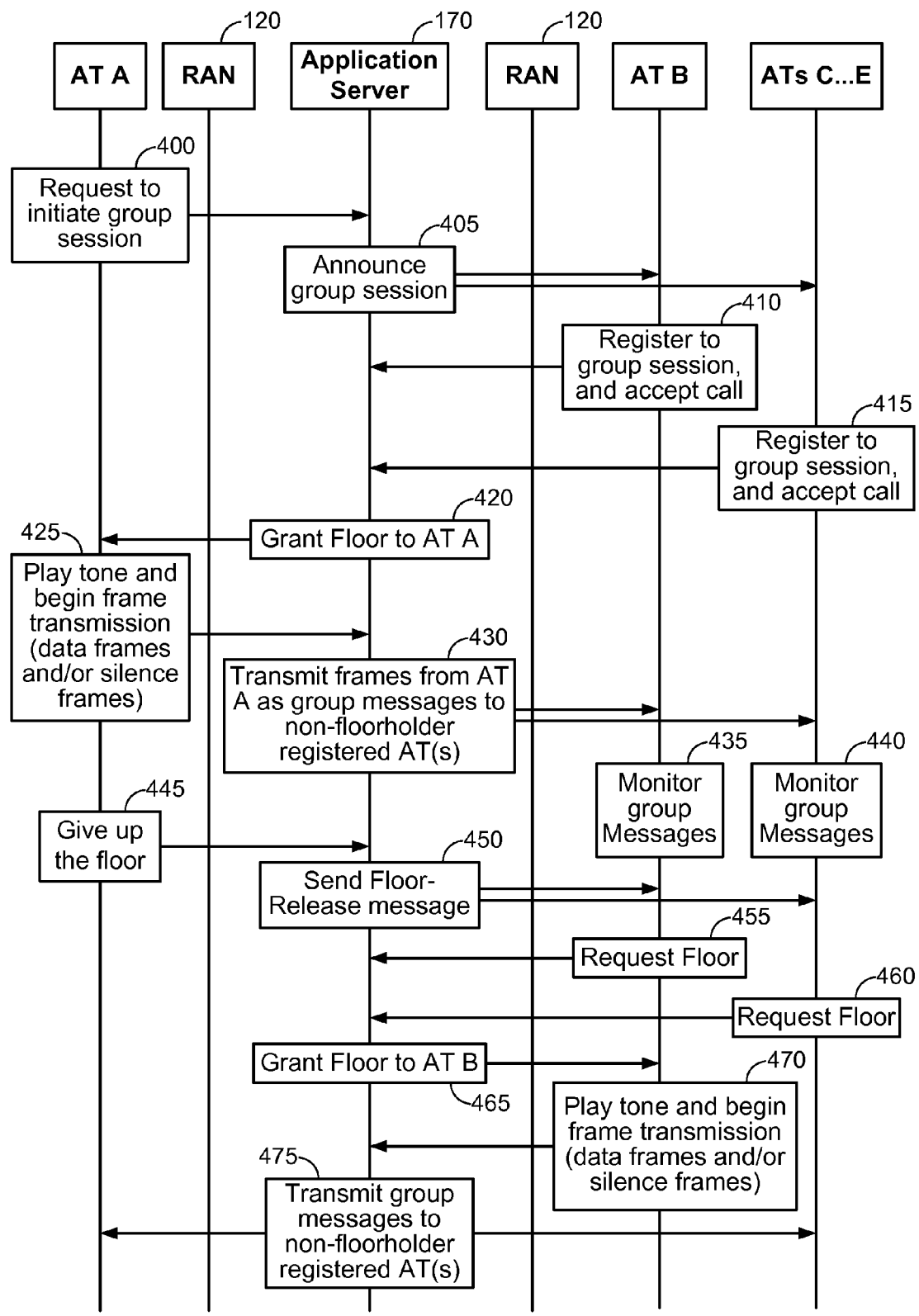
FIG. 4A illustrates a conventional half-duplex group communication session process.

FIG. 4A illustrates a conventional half-duplex group communication session (e.g., a call, a transport session, etc.) process. The group communication session of FIG. 4A may correspond to a group communication session supported by IP multicasting protocols, or IP unicasting protocols. In IP multicasting, a downlink broadcast channel (BCH) carries a single multicast flow within one or more sectors to reach each 'listening' multicast group member, while a separate scheduling message (e.g., a broadcast overhead message (BOM)) is transmitted on a downlink control channel that indicates how the multicast group members can tune to the downlink BCH. In IP unicasting, each group message is transmitted to each group communication session participant, or multicast group member, as a separate unicast message that is addressed to each group member individually.

Referring to FIG. 4A, in 400, a given AT ("AT A") sends a request to the application server 170 via the RAN 120 to initiate a group communication session. For example, the group communication session may correspond to a push-to-talk (PTT) or push-to-transfer (PTX) session, and the transmission of the request in 400 may be prompted based on a user of AT A pressing a PTT or PTX button on AT A. The application server 170 receives the group communication session request from AT A, and transmits an announce message in one or more sectors of the wireless communication system 100, 405. At least ATs B . . . E receive the announce message, and determine to join the announced group communication session. Accordingly, ATs B . . . E send a call accept message to the application server 170, and also send a registration message (e.g., BCMCSFlowRegistration message) to the RAN 120 to register to the group communication session, 410 and 415. The call accept message and registration message from each of ATs B . . . E may either be sent within separate messages on a reverse link access channel, or alternatively may be bundled within the same message.

After receiving a call accept message from a first responder to the announce message from among ATs B . . . E, the application server 170 grants the floor for the group communication session to AT A, 420. Accordingly, after receiving the floor-grant message, AT A plays a tone to indicate to a user of AT A that the user can begin speaking, and AT A begins transmitting frames on a reverse link channel to the application server 170, 425. The series of frame transmissions from 425 can correspond to data frames that actually include voice data, or alternatively can correspond to silence frames that do not actually include voice data.

Each frame transmission can correspond to a real-time transport protocol (RTP) packet or datagram, or alternatively a RTCP (RTP Control Protocol) packet. A header portion of a 40-octet overhead RTP packet may be configured as follows:

sources. Contributing sources can be added by a mixer at the application server 170, and are relevant for conferencing applications where elements of the data payload have originated from different computers. For point-to-point communications, CSRCs are not necessarily required. The Sequence Number field holds a unique reference number which increments by one for each RTP packet sent from a particular source, or AT. The Sequence Number field allows the receiver to reconstruct the sender's packet sequence. The Timestamp field corresponds to the time that the RTP packet was transmitted by the AT. The Timestamp field allows the receiving AT(s) to buffer and playout the data in a continuous stream. The SSRC number field corresponds to a number that identifies the source of the RTP packet, which in 425 identifies AT A. The SSRC number can be provisioned by the application server 170 at the start of the group communication session.

After the RTP header portion, the RTP packet includes a data payload portion. The data payload portion can include digitized samples of voice and/or video. The length of the data payload can vary for different RTP packets. For example, in voice RTP packets, the length of the voice sample carried by the data payload may correspond to 20 milliseconds (ms) of sound. Generally, for longer media durations (e.g., higher-rate frames), the data payload either has to be longer as well, or else the quality of the media sample is reduced.

Returning to 425 of FIG. 4A, the frames transmitted from AT A can correspond to full-rate frames (e.g., 8.6 kpbs) that have a large data payload in the RTP packet, half-rate frames (e.g., 4.3 kpbs) that include a 'medium' data payload in the RTP packet, ⅛th rate frames (e.g., 1.0 kpbs) that include a small data payload in the RTP packet, and so on. While references are generally made to EVRC-A, it will be readily apparent how these embodiments can be modified to accommodate other vocoders that include different frame rate options. As will be appreciated, when a user of AT A is speaking, AT A transmits higher-rate frames than when the user of AT A is not speaking and AT A is transmitting silence

TABLE 1

Example of a RTP packet header

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| | Octet 1, 5, 9 . . . | | | | | | | | Octet 2, 6, 10 . . . | | | | | | | | Octet 3, 7, 11 . . . | | | | | | | | Octet 4, 8, 12 . . . | | | | | | | |
| 1-4 | Version | | | | IHL | | | | Type of service | | | | | | | | Total length | | | | | | | | | | | | | | | |
| 5-8 | Identification | | | | | | | | | | | | | | | | Flags | | | Fragment offset | | | | | | | | | | | | |
| 9-12 | Time to live | | | | | | | | Protocol | | | | | | | | Header checksum | | | | | | | | | | | | | | | |
| 13-16 | Source address | | | | | | | | | | | | | | | | | | | | | | | | | | | | | | | |
| 17-20 | Destination address | | | | | | | | | | | | | | | | | | | | | | | | | | | | | | | |
| 21-24 | Source port | | | | | | | | | | | | | | | | Destination port | | | | | | | | | | | | | | | |
| 25-28 | Length | | | | | | | | | | | | | | | | Checksum | | | | | | | | | | | | | | | |
| 29-32 | V = 2 | | P | X | CC | | | | M | PT | | | | | | | Sequence number | | | | | | | | | | | | | | | |
| 33-36 | Timestamp | | | | | | | | | | | | | | | | | | | | | | | | | | | | | | | |
| 37-40 | Synchronization source (SSRC) number | | | | | | | | | | | | | | | | | | | | | | | | | | | | | | | |

Referring to Table 1, the fields of the RTP packet header portion are well-known in the art. However, certain fields are discussed in more detail with respect to embodiments described in more detail below, and as such will be referred to briefly in this section. For example, the contribution count (CC) field, Sequence Number field, Timestamp field and SSRC number field will now be addressed briefly. The CC field is an optional field that can hold a contributing source (CSRC) count value. Although not shown on the header diagram of Table 1 (above), the 12 octet header of the CC field can optionally be expanded to include more contributing frames. The application server 170 includes a media control complex (MCC) 170B module that handles the receipt of a media stream from floor-holders, and the transcoding of an output stream to one or more 'listening' group members to the group communication session. In other words, the MCC module 172 replicates and re-broadcasts the frames within RTP packets from AT A to each of ATs B . . . E. Accordingly, a series of frame transmissions from AT A that are received at the MCC module 170B of the application server 170 may be represented as follows:

TABLE 2

Media Frames arriving at the MCC from AT A at 't' interval for Half-Duplex

|   | 10t | 9t | 8t | 7t | 6t | 5t | 4t | 3t | 2t | T |
|---|---|---|---|---|---|---|---|---|---|---|
| A | ■ ½ | ■ ½ | □ ⅛ | □ ⅛ | ■ ½ | ■ ½ | □ ⅛ | ■ ½ | □ ⅛ | ■ ½ |
| B | — | — | — | — | — | — | — | — | — | — |
| C | — | — | — | — | — | — | — | — | — | — |
| D | — | — | — | — | — | — | — | — | — | — |
| E | — | — | — | — | — | — | — | — | — | — | wherein time intervals 10t ... T each include one frame (e.g., RTP packet) having a given data-rate from AT A. It may be assumed that the ■ ½ frames correspond to data frames (e.g., including voice data), whereas the □ ⅛ correspond to silence frames. However, it is appreciated that it is at least possible for a ■ ½ frame to include a limited amount of noise, similar to a silence frame. Also, because FIG. 4A is a half-duplex group communication session, it is noted that Table 2 (above) indicates that AT A is transmitting frames (e.g., within one or more RTP packets), whereas ATs B ... E are not transmitting any packets. The frames (e.g., RTP packets) illustrated in Table 2 correspond to an input stream of packets or frames that are received at the application server 170.

As noted above, the MCC module 170B receives the input stream as illustrated above in Table 2, and generates or transcodes an output stream that is transmitted to ATs B ... E. Accordingly, based on Table 2, the output stream generated by the MCC module 170B of the application server 170 may be configured as follows:

TABLE 3

Media Frames in the output stream from the MCC to ATs B ... E for Half-Duplex

|   | 10t | 9t | 8t | 7t | 6t | 5t | 4t | 3t | 2t | T |
|---|---|---|---|---|---|---|---|---|---|---|
| A | — | — | — | — | — | — | — | — | — | — |
| B | ■ ½ | ■ ½ | □ ⅛ | □ ⅛ | ■ ½ | ■ ½ | □ ⅛ | ■ ½ | □ ⅛ | ■ ½ |
| C | ■ ½ | ■ ½ | □ ⅛ | □ ⅛ | ■ ½ | ■ ½ | □ ⅛ | ■ ½ | □ ⅛ | ■ ½ |
| D | ■ ½ | ■ ½ | □ ⅛ | □ ⅛ | ■ ½ | ■ ½ | □ ⅛ | ■ ½ | □ ⅛ | ■ ½ |
| E | ■ ½ | ■ ½ | □ ⅛ | □ ⅛ | ■ ½ | ■ ½ | □ ⅛ | ■ ½ | □ ⅛ | ■ ½ |

As shown in Table 3 (above), the output stream is configured such that AT A's frame transmissions are not transmitted back to AT A, but are rather transmitted to ATs B ... E in Table 2, above.

As the output stream is generated by the MCC module 170B, the application server 170 transmits RTP packets including output frames from the output stream to ATs B ... E, 430, as a series of group messages, and ATs B ... E monitor the group messages for the group communication session, 435 and 440. The group communication session then continues for a period of time, until a user of AT A determines to give up the floor, 445. 445 can correspond to an explicit instruction from AT A to give up the floor, or based on a period of inactivity from AT A (i.e., too many silence frames).

After determining AT A has given up the floor to the group communication session, the application server 170 sends a floor-release message to ATs B ... E, 450. Assume that a user of AT B and at least one of ATs C ... E determine to attempt to gain control of the floor, and send floor request messages to the application server 170, 455 and 460. The application server 170 thereby receives multiple floor request messages, and evaluates priority levels of the ATs requesting the floor to determine the AT that will next be granted the floor. For example, based on the type of group communication session, the RAN 120 may evaluate one or more priority tables maintained at the RAN 120, and may grant the floor to a highest-priority AT from among the ATs requesting the floor. For example, the priority tables may be configured as follows:

TABLE 4

Priority Tables to Evaluate Floor Requests

| Direct Calls | | Adhoc Calls | | Closed Group Calls | | Closed Chat room Calls | |
|---|---|---|---|---|---|---|---|
| User | Priority | User | Priority | User | Priority | User | Priority |
| A | 7 | A | 7 | A | 2 | A | 2 |
| B | 7 | B | 7 | B | 5 | B | 5 |
| C | 7 | C | 7 | C | 7 | C | 7 |

TABLE 4-continued

Priority Tables to Evaluate Floor Requests

| Direct Calls | | Adhoc Calls | | Closed Group Calls | | Closed Chat room Calls | |
|---|---|---|---|---|---|---|---|
| User | Priority | User | Priority | User | Priority | User | Priority |
| D | 7 | D | 7 | D | 1 | D | 1 |
| E | 7 | E | 7 | E | 3 | E | 3 |

In 465, assume that the application server 170 determines AT B has the highest priority level from among the requesting AT for the call-type of the group communication session, and the application server 170 sends a floor-grant message to AT B. Next, AT B plays a tone to notify a user of AT B that AT B now has the floor, and AT B begins transmitting frames (e.g., data frames, silence frames, etc.) within one or more RTP packets to the application server 170, 470, which are then converted into an output stream by the MCC module 170B and re-transmitted to ATs A and C ... E, 475. It will be appreciated that 470 and 475 are performed in the same manner as 425 and 430 as described above with respect to AT A, and as such 470 and 475 will not be described further for the sake of brevity.

As is characteristic of a half-duplex session, certain ATs in the group communication session of FIG. 4A only transmit frames (e.g., within RTP packets), while other ATs in the group communication session only receive frames (e.g., within RTP packets). An alternative to the process of FIG. 4A is a full-duplex group communication session, which is described below with respect to FIG. 4B. In a full-duplex session, each participant to the session can both transmit and receive frames (e.g., within RTP packets).

Figure 4B:
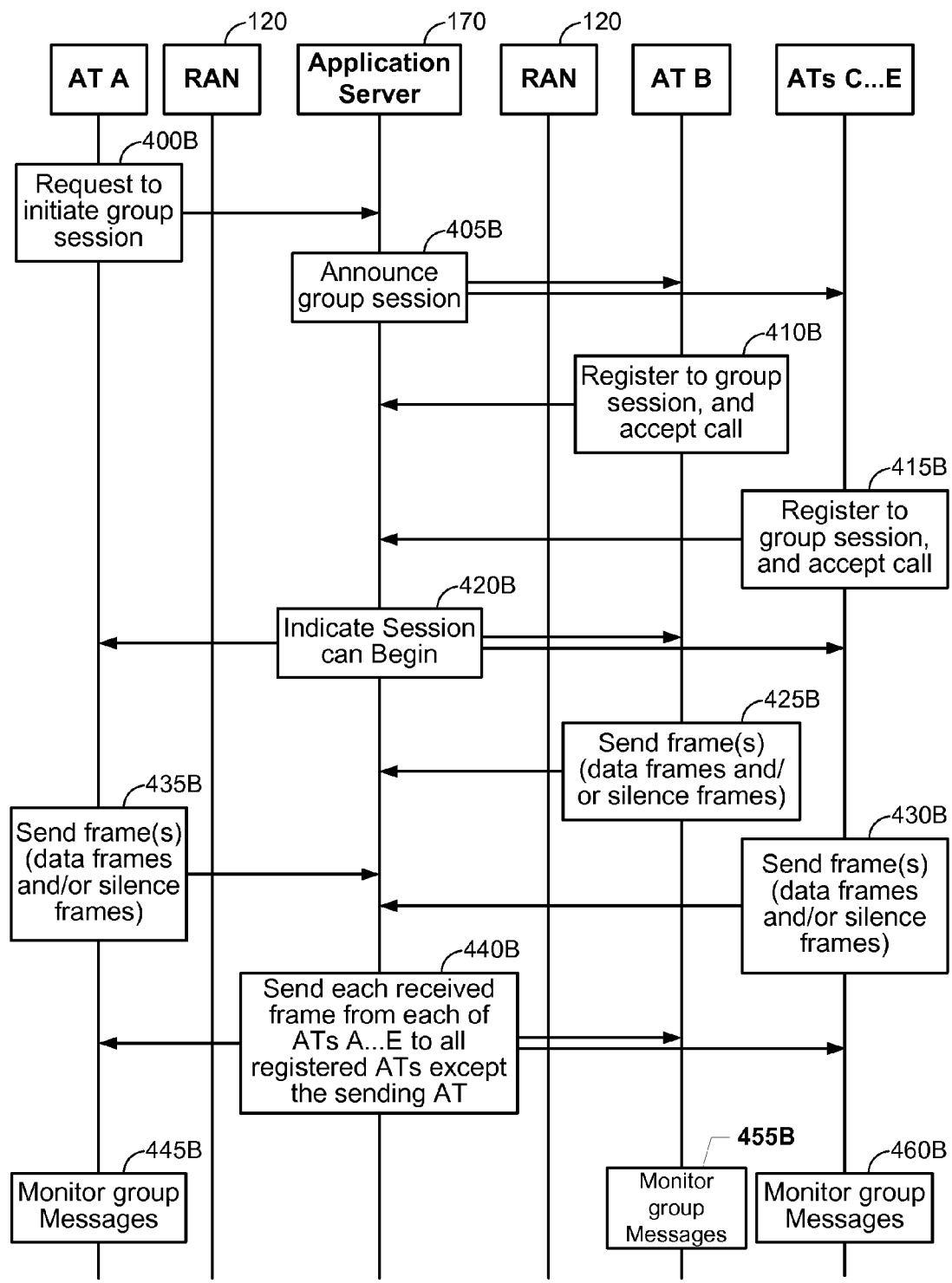
FIG. 4B illustrates a conventional full-duplex group communication process.

FIG. 4B illustrates a conventional full-duplex group communication session (e.g., a call, a data transport session, etc.) process. As in FIG. 4A, the group communication session of FIG. 4B may correspond to a group communication session supported by IP multicasting protocols, or IP unicasting protocols. Referring to FIG. 4B, 400B through 415B correspond to 400 through 415 of FIG. 4A, and as such will not be discussed further for the sake of brevity.

In 420B, instead of granting the floor to the session initiator (i.e., AT A), the application server 170 sends a message to each AT that has joined the group communication session indicating that the session can begin, 420B. Upon receiving the message 420B, any of ATs A . . . E can begin speaking and thereby send data frames, or else can remain silent and send silence frames, 425B, 430B, 435B.

An example of the input stream from ATs A . . . E (e.g., the frames included within RTP packets from ATs A . . . E for particular timeslots) that are received at the MCC module 170B of the application server 170 may be represented as follows:

rate. In particular, AT A is sending a series of half-rate frames (e.g., which indicates that a user of AT A is likely speaking to ATs B . . . E, and sending voice data), while ATs B . . . E are sending a series of ⅛th rate frames (e.g., which indicates that the users of ATs B . . . E are likely listening to AT A, have walked away from their phones, etc.).

Returning to FIG. 4B, in 440B, the MCC module 172 of the application server 170 includes each of the frames from the input streams at each time interval t, de-jitters the aggregated media stream, and then generates an output stream that includes all the media content from each of ATs A . . . E for that time interval. The application server 170 then sends the resultant media stream to each of ATs A . . . E as a series of aggregated frames within one or more RTP packets. However, it is appreciated that each of ATs A . . . E receives an aggregated media stream containing frames from all session participants, except itself, to avoid feedback problems. Thus, AT A receives an output stream composed of aggregated media from ATs B . . . E, AT B receives an output stream composed of aggregated media from ATs A and C . . . E, and so on.

As noted above, the MCC module 170B receives the frames from ATs A . . . E (i.e., the input stream) as illustrated above in Table 5 (above), and then generates or transcodes output streams that are transmitted to ATs A . . . E (e.g., which are each different because each output stream omits the frames of the input stream received from the target in order to reduce feedback). Accordingly, based on Table 5 (above), the output stream generated by the MCC module 170B of the

TABLE 5

Media Frames arriving at the MCC from ATs A . . . E at 't' interval for Full-Duplex

|   | 10t | 9t | 8t | 7t | 6t | 5t | 4t | 3t | 2t | T |
|---|---|---|---|---|---|---|---|---|---|---|
| A | ■ ½ | ■ ½ | ■ ½ | ■ ½ | ■ ½ | ■ ½ | ■ ½ | ■ ½ | ■ ½ | ■ ½ |
| B | □ ⅛ | □ ⅛ | □ ⅛ | □ ⅛ | □ ⅛ | □ ⅛ | □ ⅛ | □ ⅛ | □ ⅛ | □ ⅛ |
| C | □ ⅛ | □ ⅛ | □ ⅛ | □ ⅛ | □ ⅛ | □ ⅛ | □ ⅛ | □ ⅛ | □ ⅛ | □ ⅛ |
| D | □ ⅛ | □ ⅛ | □ ⅛ | □ ⅛ | □ ⅛ | □ ⅛ | □ ⅛ | □ ⅛ | □ ⅛ | □ ⅛ |
| E | □ ⅛ | □ ⅛ | □ ⅛ | □ ⅛ | □ ⅛ | □ ⅛ | □ ⅛ | □ ⅛ | □ ⅛ | □ ⅛ |

Referring to Table 5 (above), each of ATs A . . . E is transmitting frames over timeslots 10t . . . T at a given data application server 170 over timeslots 10t . . . T may be configured as follows:

TABLE 6

Media Frames in the output streams from the MCC to ATs A . . . E for Full-Duplex

|   |   | 10t | 9t | 8t | 7t | 6t | 5t | 4t | 3t | 2t | T |
|---|---|---|---|---|---|---|---|---|---|---|---|
| A |   | □ ⅛ (B) | □ ⅛ (B) | □ ⅛ (B) | □ ⅛ (B) | □ ⅛ (B) | □ ⅛ (B) | □ ⅛ (B) | □ ⅛ (B) | □ ⅛ (B) | □ ⅛ (B) |
|   |   | □ ⅛ (C) | □ ⅛ (C) | □ ⅛ (C) | □ ⅛ (C) | □ ⅛ (C) | □ ⅛ (C) | □ ⅛ (C) | □ ⅛ (C) | □ ⅛ (C) | □ ⅛ (C) |
|   |   | □ ⅛ (D) | □ ⅛ (D) | □ ⅛ (D) | □ ⅛ (D) | □ ⅛ (D) | □ ⅛ (D) | □ ⅛ (D) | □ ⅛ (D) | □ ⅛ (D) | □ ⅛ (D) |
|   |   | □ ⅛ (E) | □ ⅛ (E) | □ ⅛ (E) | □ ⅛ (E) | □ ⅛ (E) | □ ⅛ (E) | □ ⅛ (E) | □ ⅛ (E) | □ ⅛ (E) | □ ⅛ (E) |
| B |   | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) |
|   |   | □ ⅛ (C) | □ ⅛ (C) | □ ⅛ (C) | □ ⅛ (C) | □ ⅛ (C) | □ ⅛ (C) | □ ⅛ (C) | □ ⅛ (C) | □ ⅛ (C) | □ ⅛ (C) |
|   |   | □ ⅛ (D) | □ ⅛ (D) | □ ⅛ (D) | □ ⅛ (D) | □ ⅛ (D) | □ ⅛ (D) | □ ⅛ (D) | □ ⅛ (D) | □ ⅛ (D) | □ ⅛ (D) |
|   |   | □ ⅛ (E) | □ ⅛ (E) | □ ⅛ (E) | □ ⅛ (E) | □ ⅛ (E) | □ ⅛ (E) | □ ⅛ (E) | □ ⅛ (E) | □ ⅛ (E) | □ ⅛ (E) |
| C |   | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) |

TABLE 6-continued

Media Frames in the output streams from the MCC to ATs A . . . E for Full-Duplex

| | 10t | 9t | 8t | 7t | 6t | 5t | 4t | 3t | 2t | T |
|---|---|---|---|---|---|---|---|---|---|---|
| | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) |
| | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) |
| | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) |
| D | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) |
| | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) |
| | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) |
| | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) | ☐ ⅛ (E) |
| E | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) | ■ ½ (A) |
| | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) | ☐ ⅛ (B) |
| | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) | ☐ ⅛ (C) |
| | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) | ☐ ⅛ (D) |

As shown in Table 6 (above), due to a simplistic brute force forwarding implementation of the group communication session, the aggregated media frames to ATs A . . . E at each timeslot of the output stream has a total data-rate equal to the sum of the data-rates for frames (e.g., or RTP packets) from ATs other than itself.

With respect to the conventional half-duplex implementation for the group communication session in FIG. 4A, it will be appreciated that bandwidth utilization is superior as compared to the full-duplex implementation for the group communication session of FIG. 4A. However, the inability of ATs to transmit to the group can, at times, be problematic (e.g., if a current floor-holder does not give up the floor and keeps on talking about irrelevant issues). In half-duplex, the current floor-holder would be oblivious to the sentiment of the group because the floor-holder cannot receive feedback from the other group-members until the floor is released.

This problem does not occur in the full-duplex implementation of FIG. 4B. However, the bandwidth requirements of a full-duplex implementation are high, because for N group communication session participants, each participant receives an aggregated output stream having N−1 combined media flows, which consumes a relatively high amount of bandwidth. Also, aggregating a high number of media frames to form the media frames of the output stream can be processing intensive at the application server 170. Also, the MCC module 172 of the application server 170 does not distinguish between media flows. Thus, silence frames are granted the same priority as data frames in the output stream when the frames contend for the same timeslot in the output stream.

Figure 4C:
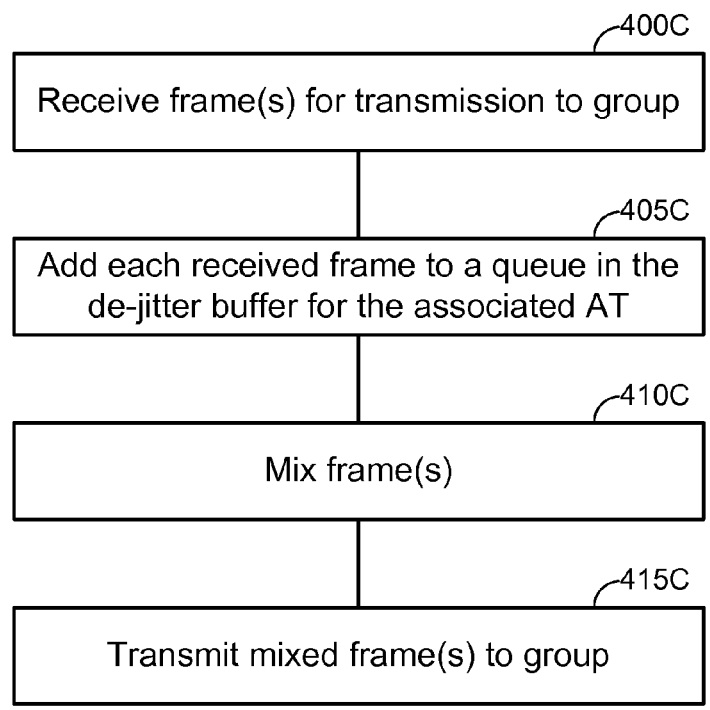
FIG. 4C illustrates a conventional mixing process that occurs at the application server in FIG. 4A and/or FIG. 4B.

FIG. 4C illustrates in more detail the process that occurs at the application server 170 during the sending steps of 430 of FIG. 4A, 475 of FIG. 4A and/or 440B of FIG. 4B. Referring to FIG. 4C, the application server 170 receives one or more frames for transmission to a group of ATs, 400C. For example, in 430 of FIG. 4A, the application server 170 receives frame(s) from AT A sent at 425 of FIG. 4A, and in 475 of FIG. 4A, the application server 170 receives frame(s) from AT B sent at 470 of FIG. 4A. In a further example, in 440B of FIG. 4B, the application server 170 receives frame(s) from each of ATs A . . . E sent between 425B and 435B of FIG. 4B.

Upon receiving each of the frames in 400C, the controller 172A of the particular MCC 170B that is handling the media-exchange for the server-arbitrated group communication session adds each received frame from 400C into a corresponding queue in the de-jitter buffer 172B for the associated AT, 405C. When the mixer 172C is ready, the mixer 172C removes one or more frames from the respective queues of the de-jitter buffer 172B for a particular timeslot and performs a mixing operation on the one or more frames, 410C. In the case of half-duplex, there will typically frames from only one AT (i.e., the current floor-holder), so that actual mixing of media need not be performed, the de-jitter buffer need not be used and frames can simply be forwarded from the MCC 170B as received without header-modification. Accordingly, FIG. 4C is primarily directed to a process performed for a full-duplex session. In the case of full-duplex, there will typically be frames from more than one AT (e.g., although not necessarily from each AT per-timeslot), such that the mixer 172C mixes the actual media, or payload portion, within each frame for a particular timeslot, as is known in the art. As will be appreciated, it is also possible in full-duplex to have frames received from only one AT for a period of time, as in half-duplex, such as when one session participant is doing most of the speaking during the session. However, when a single frame is received during a full-duplex session, the de-jitter buffer 172B is still used as when multiple frames are received, such that delays associated with the de-jitter buffer 172B are still experienced. After mixing the frame(s) in 410C, the controller 172A directs the mixed frame(s) to be transmitted to the group.

Figure 4D:
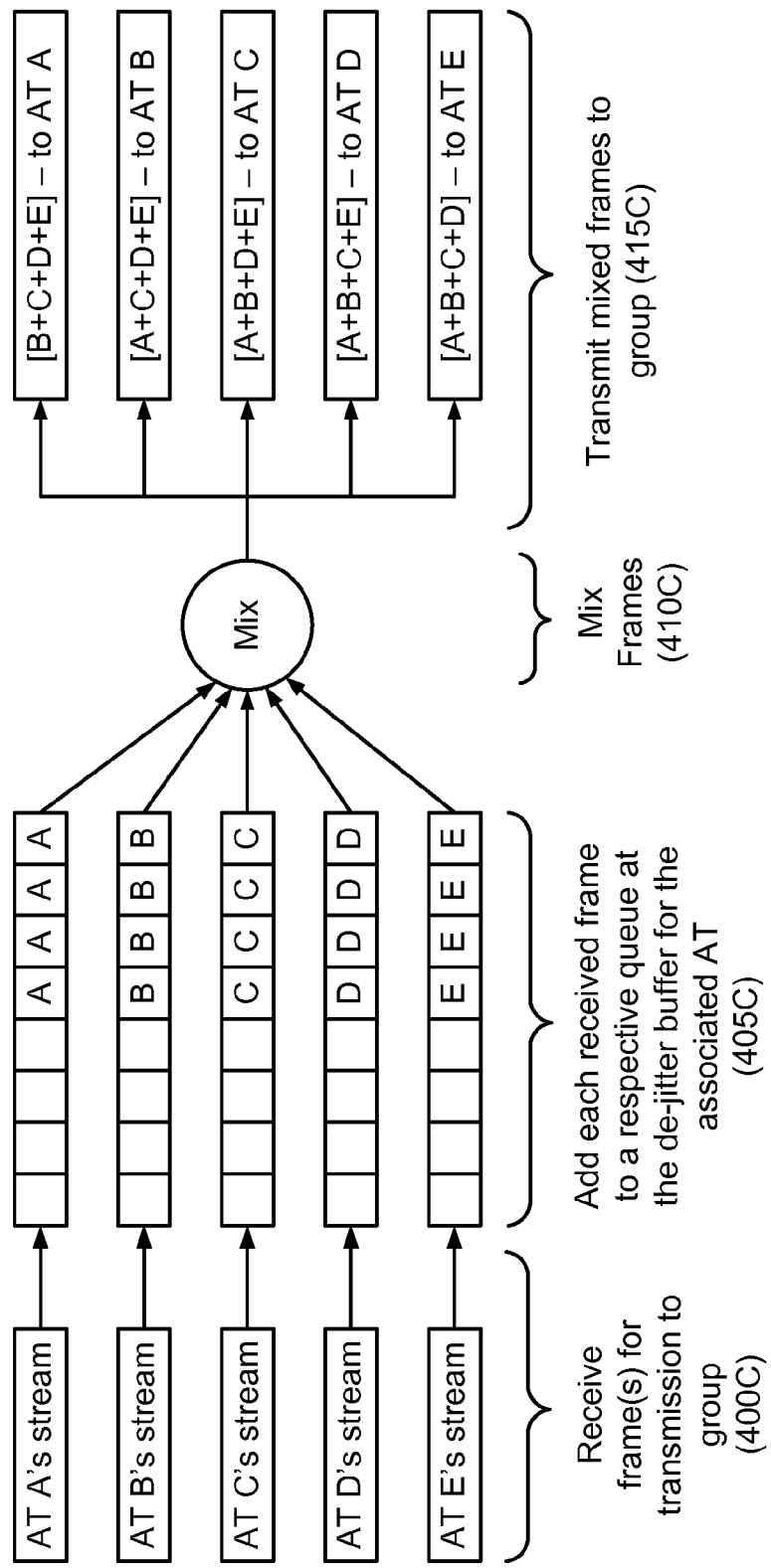
FIGS. 4D and 4E illustrate implementation examples of the process of FIG. 4C.
Figure 4E:
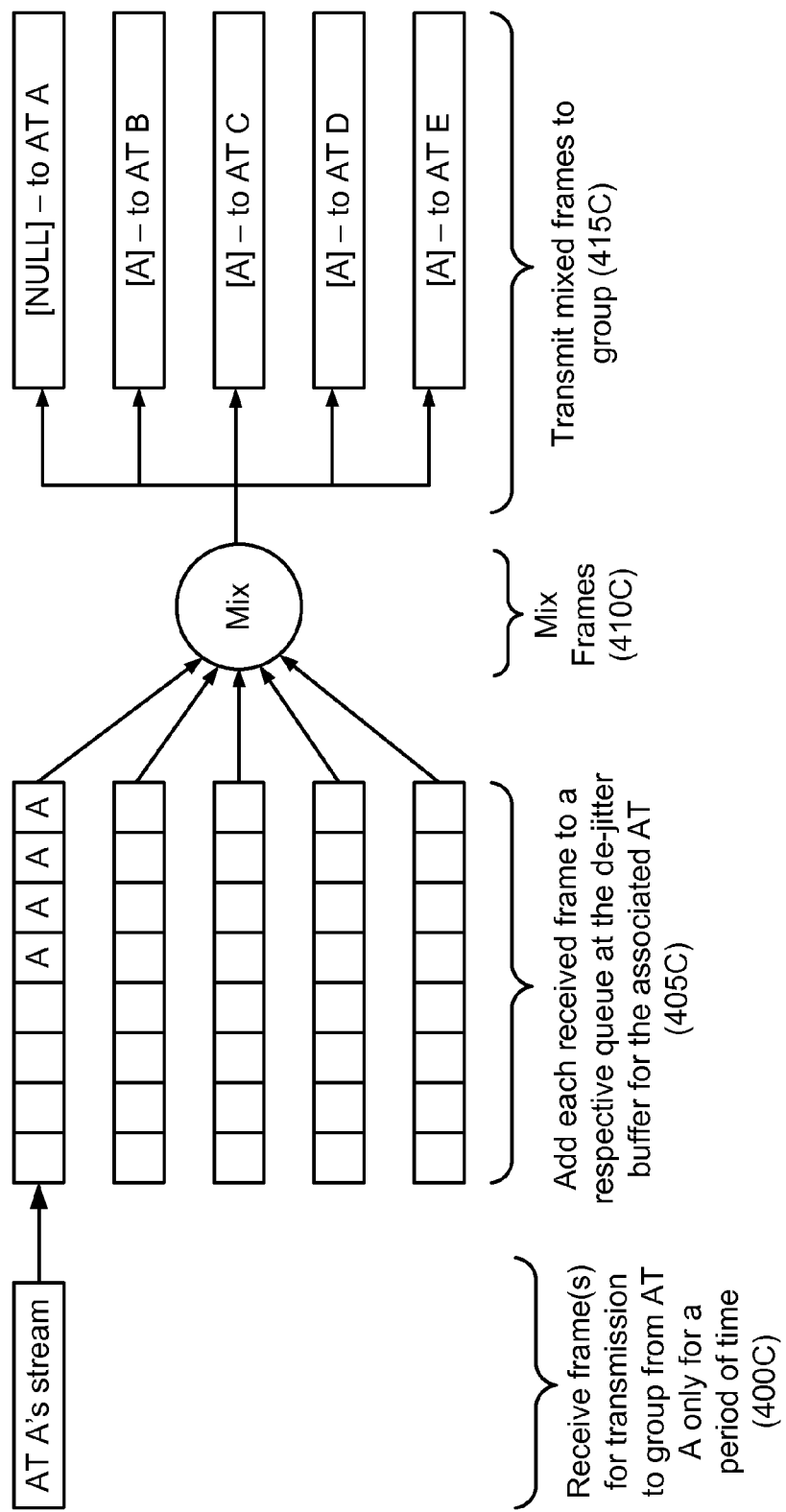

FIGS. 4D and 4E illustrate implementation examples of the process of FIG. 4C. In particular, FIG. 4D illustrates a full-duplex session implementation example where each of ATs A . . . E transmit a frame during each time-slot as in FIG. 4B, and FIG. 4E illustrates an implementation example where only AT 1 transmits a frame during each time-slot for a period of time (e.g., in a full-duplex session where AT A happens to be doing all of the talking for the period of time).

Referring to FIG. 4D, a data stream (e.g., a series of frames) is received from each of ATs A . . . E at the MCC 170B of the application server 170 that is handling the arbitration of the group communication session, 400C. The controller 172A adds each received frame from 400C to a queue in the de-jitter buffer 172B for the associated AT, 405C. As shown in FIG. 4D, the queues for each of ATs A . . . E show a number of frames (e.g., denoted by the letter of the corresponding AT from which the frames are received) that are waiting to be processed or mixed by the mixer 172C. When frames for a given timeslot arrive at the top of their respective queues, the controller 172A removes these frames from the queues in the de-jitter buffer 172B and sends these frames to the mixer 172C for mixing, 410C. As such, the mixer 172C mixes the frames from each of ATs A . . . E for a given timeslot in 410C. Then, the controller 172A directs the mixed frames to be transmitted to each session participant of the group communication session, 415C. As shown in FIG. 4D, the mixed frame sent to each AT includes media from each other AT, such that the mixed frame sent to AT A includes frames from ATs B+C+D+E, the mixed frame sent to AT B includes frames from ATs A+C+D+E, the mixed frame sent to AT C includes frames from ATs A+B+D+E, the mixed frame sent to AT D includes frames from ATs A+B+C+E, and the mixed frame sent to AT E includes frames from ATs A+B+C+D.

Referring to FIG. 4E, a data stream (e.g., a series of voice or high-data rate frames) is received from only AT A at the MCC 170B of the application server 170 that is handling the arbitration of a full-duplex group communication session, 400C. As noted above, frames being received from only one AT (e.g., AT A, in this case) can occur for a period during a full-duplex session where only one AT is sending voice media for transmission to the group. As will be appreciated, other frames can be received at the MCC 170B from one or more other of ATs B . . . E, but these frames are assumed in FIG. 4E to correspond to noise frames or silence frames (e.g., low-data rate frames, etc.) and the controller 170A is configured to drop such frames and refrain from adding such frames to a queue at de-jitter buffer 172B. The controller 172A adds each received frame (e.g., meaning each received voice-frame or high-data rate frame, while excluding noise-frames and/or silence-frames) from 400C to a queue in the de-jitter buffer 172B for the associated AT (i.e., AT A), 405C. As shown in FIG. 4E, the queue for each of AT A shows a number of frames (e.g., denoted by the letter 'A' in AT A's queue) that are waiting to be processed or mixed by the mixer 172C, whereas the queues for ATs B . . . E are each empty because it is assumed that no voice-packets have been received from ATs B . . . E for a period of time. When a frame for AT A at a given timeslot arrives at the top of its queue, the controller 172A removes the frame from the queue in the de-jitter buffer 172B and sends the frame to the mixer 172C for mixing, 410C. As such, the mixer 172C performs a mixing operation on the frame from AT A for a given timeslot in 410C. In this case, the mixing operation performed by the mixer 172C corresponds to formatting the media in the input-frame such that the RTP header of the output-frame is appropriate for the output stream (e.g., the sequence number from AT A's input stream is modified to correspond to a correct sequence number for a next frame in the output stream, and so on). Then, the controller 172A directs the mixed (or formatted, in this case) frame to be transmitted to one or more session participants of the group communication session, 415C. As shown in FIG. 4E, the mixed frame sent to each AT includes media from each other AT that is transmitting frames for the time-slot. In this case, because only AT A is transmitting frames for the current timeslot, the formatted frame sent to each of ATs B . . . E includes only AT A's frame, and AT A can be sent a NULL frame (e.g., a frame including no media). Alternatively, while not shown in FIG. 4E, instead of a NULL frame, no frame may be transmitted to AT A in 415C.

As will be appreciated by one of ordinary skill in the art, the mixing of media from multiple frames that occurs at the mixer 172C in 410C as in FIG. 4D is relatively processing intensive, which is, in part, what necessitates the queuing of frames in the de-jitter buffer 172B. Thus, the mixer 172C generally cannot guarantee adequate performance when mixing media from multiple frames on-the-fly, or in real-time, and as such the mixer 172C queues the frames and handles the mixing for each timeslot in turn. Increasing the size of the de-jitter buffer 172B will thereby increase the audio quality of each frame in the output-stream, although increasing the de-jitter buffer 172B size too far will create lag in the output-stream.

On the other hand, the mixing operation of re-packaging or formatting one frame for a particular timeslot at the mixer 172C, as in 410C in FIG. 4E, is not as processing intensive as the multiple media-frame mixing of FIG. 4D. Thus, it is possible that such formatting can occur in real-time without using the de-jitter buffer 172B. However, conventional group communication sessions that potentially mix multiple multiple-media frames during a single timeslot (e.g., as in a full-duplex session as shown in FIG. 4D) queue frames in the de-jitter buffer 172B irrespective of the number of frames being mixed for the timeslot.

Accordingly, embodiments of the invention are directed to selectively queuing frames in the de-jitter buffer 172B. As will be discussed below with respect to FIGS. 5A and 5B, frames are added to the queues in the de-jitter buffer 172B if the number of frames to be mixed for a given timeslot is greater than a threshold number of frames (e.g., greater than one). However, if the number of frames to be mixed is not greater than the threshold number of frames (e.g., one frame) for each timeslot in a given number of consecutive timeslots (e.g., three timeslots, six timeslots, etc.), then the de-jitter buffer 172B is bypassed such that subsequent frames(s) to be mixed are passed directly to the mixer 172C (e.g., for formatting or re-packaging of the RTP header) at least until the number of frames to be mixed in a particular timeslot is above the threshold number. In this manner, delays associated with the de-jitter buffer 172B can be reduced at least during timeslots when more intensive-processing is not expected to be used by the mixer 172C.

Figure 5A:
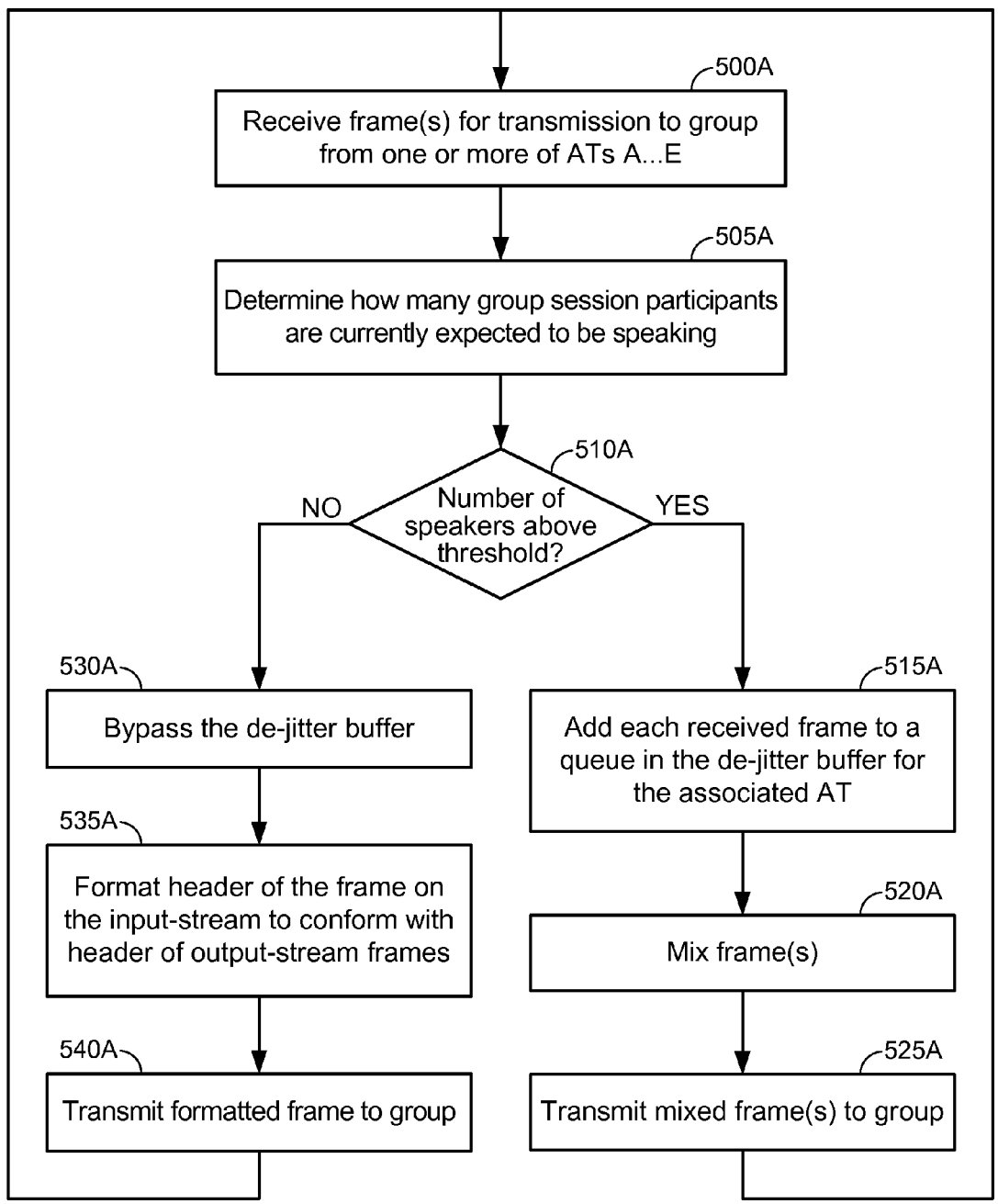
FIG. 5A illustrates a selective mixing process that occurs at the application server in accordance with an embodiment of the invention.

FIG. 5A illustrates a selective mixing process that occurs at the MCC 170B of the application server 170 in accordance with an embodiment of the invention. In an example, the process of FIG. 5A may be implemented during the sending steps of 430 of FIG. 4A, 475 of FIG. 4A and/or 440B of FIG. 4B. Referring to FIG. 5A, the application server 170 receives one or more frames for transmission to a group of ATs, 500A. For example, in 430 of FIG. 4A, the application server 170 receives frame(s) from AT A sent at 425 of FIG. 4A, and in 475 of FIG. 4A, the application server 170 receives frame(s) from AT B sent at 470 of FIG. 4A. For example, in 440B of FIG. 4B, the application server 170 receives frame(s) from each of ATs A . . . E sent between 425B and 435B of FIG. 4B.

Upon receiving each of the frames in 500C, the controller 172A of the particular MCC 170B that is handling the media-exchange for the server-arbitrated group communication session determines the number of group session participants that are expected to currently be speaking, 505A. For example, the determination of 505A may correspond to a determination of how many frames received in 500A are non-silence frames (e.g., frames that have a data rate higher than $\frac{1}{8}^{th}$, etc.). In 510A, the controller 172A determines whether the number determined in 505A is higher than a given threshold for a given number of timeslots (e.g., one timeslot, a number of timeslots equal to the depth of the queues in the de-jitter buffer 172B, a number of timeslots higher than the depth of the queues in the de-jitter buffer 172B, etc.). If the number is above the threshold, for the given number of timeslots, then the process advances to 515A, 520A and 525A, which generally correspond to 405C, 410C and 415C, respectively, of FIG. 4C, and as such will not be described further for the sake of brevity. However, it will be appreciated that the particular mixing-examples provided above with respect to 410C are intended to be non-limiting examples of potential mixing methodologies, and there are a number of ways in which the media of multiple frames can be mixed during a communication session in other embodiments of the invention. After 525A, the process returns to 500A of FIG. 5A and is performed for a subsequent timeslot.

Returning to 510A, if the number is not above the threshold, then the controller 172A determines to bypass the de-jitter buffer 172B entirely, 530A. In 530A, it will be appreciated that it is possible that one or more queues of the de-jitter buffer 172B may include frames that are waiting to be mixed by the mixer 172C. In this case, in an example, during a switch from 'mixing' mode to 'forwarding' or 'de-jitter buffer bypass' mode, the controller 172A can format the queued packets or frames (e.g., without mixing) as necessary (e.g., see description of 535A below) and then forwards each queued packet for transmission to the group (e.g., see description of 540A below). In an example, if decision block 510A evaluates to 'N' only after the number of speakers is below the threshold for a period of time greater than the depth of the queues of the de-jitter buffer 172B, it will be appreciated that the de-jitter buffer 172B only includes queued frames from one particular AT, and as such the 'dumping' of the de-jitter buffer 172B when decision block 510A evaluates to 'N' can be performed without jitter because each forwarded frame is from the same AT. Once the queues in the de-jitter buffer 172B are cleared, the process advances to 535A.

Returning to 530A, as will be appreciated, the bypassing of the de-jitter buffer 172B is not intended to imply that no buffer is used during the process, but simply that the de-jitter buffer 172B is not used (e.g., at least for this particular timeslot). Other buffers, such as a temporary storage buffer that simply holds incoming messages when received at the MCC 170B, can still be used for temporary storage at the application server 170. The controller 172A directs the received frame(s) to the mixer 172C in 535A, and the mixer 172C modifies (e.g., formats and/or re-packages) the header(s) of the received frame(s) from 500A to conform with the headers of the output-stream frames. As noted above, this can involve changing one or more fields of the RTP packet header used in the output-stream so as to conform with an expected sequence number, etc. The controller 172A then directs the formatted frame to be transmitted to one or more session participants of the group communication session, 540A.

Figure 5B:
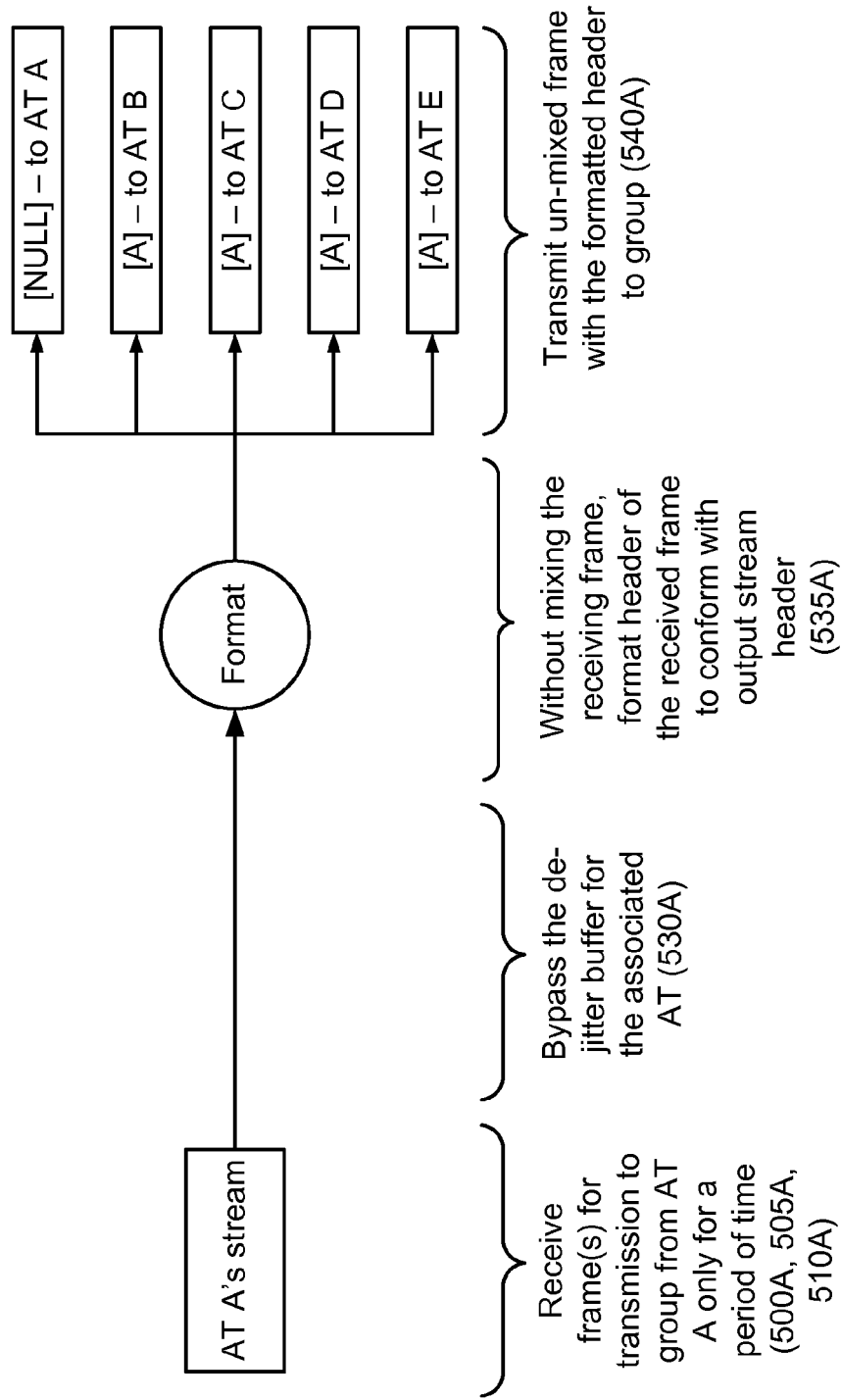
FIG. 5B illustrates an implementation example of the process of FIG. 5B in accordance with an embodiment of the invention.

Referring to FIG. 5B, similar to FIG. 4E, a data stream (e.g., a series of voice or high-data rate frames) is received from only AT A (e.g., although silence or noise frames can still be received from other ATs and then discarded by the controller 172A) at the MCC 170B of the application server 170 that is handling the arbitration of the group communication session, 500A. As noted above, a frame being received from only one AT (e.g., AT A, in this case) corresponds to a period during a full-duplex session or hybrid full-duplex session (e.g., two or more participants can speak at the same time while other participants listen-only) where only one AT is sending voice media for transmission to the group. The controller 172A determines the number of, group session participants that are speaking in this particular timeslot to be one, 505A, and then determines the number of speakers (i.e., one) to be below or equal to the speaker threshold, 510A. As shown in FIG. 5B, it may be assumed that the number of speakers is below the speaker threshold for a sufficient amount of time to trigger the bypass operation. Accordingly, the controller 172A directs the received frame from AT A to bypass the de-jitter buffer 172B, 530A, and thereby sends the frame to the mixer 172C for re-formatting, 535A. As such, the mixer 172C re-formats the frame from AT A for a given timeslot in 535A, whereby AT A's frame is formatted such that the RTP header of the output-frame is appropriate for the output stream (e.g., the sequence number from AT A's input stream is modified to correspond to a correct sequence number for a next frame in the output stream; and so on). Then, the controller 172A directs the formatted frame to be transmitted to ATs B . . . E. As shown in FIG. 5B, the formatted frame sent to each AT includes media from each other AT that is transmitting frames for the time-slot. In this case, because only AT A is transmitting frames for the current timeslot, the formatted frame sent to each of ATs B . . . E includes only AT A's frame, and AT A can be sent a NULL frame (e.g., a frame including no media). Alternatively, while not shown in FIG. 5B, instead of a NULL frame, no frame may be transmitted to AT A in 540A.

As will be appreciated, selectively using the de-jitter buffer 172B on a timeslot-by-timeslot basis allows timeslots that do not necessarily require intensive processing to be transferred directly to the mixer 172C while bypassing the de-jitter buffer 172B, which can improve performance of the group communication session by avoiding delays associated with the de-jitter buffer 172B during at least some timeslots of the group communication session. Further, audio quality of re-formatted packets that bypass the de-jitter buffer 172B can be improved because packets need not be re-encoded during the mixing process.

While above-described embodiments of the invention have generally been directed to selectively mixing frames during full-duplex sessions, it will be appreciated how the same general teachings can be applied within a hybrid full-duplex implementation. In a hybrid full-duplex session, two or more participants can speak at the same time while other participants listen-only. Thus, during hybrid full-duplex sessions where, for a period of time, whenever a lower-than-threshold number (e.g., one) of speakers are speaking for a given period of time, the jitter-buffer-bypass procedure can be invoked to conserve resources at the MCC 170B that is arbitrating the hybrid full-duplex session.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on as one or more instructions or code on a non-transitory computer-readable medium. Computer-readable media includes computer storage media including any medium that facilitates transfer of a computer program from one place to another. A non-transitory storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of selectively mixing media at an application server arbitrating a group communication session for a communication group, comprising:
   receiving media for a timeslot from a plurality of session participants sharing a floor of the group communication session for transmission to the communication group;
   determining a number of session participants that are providing non-silence media;
   determining whether to bypass the received media from entry into a de-jitter buffer based at least in part on whether the determined number exceeds a threshold number during a predefined number of consecutive timeslots, wherein the de-jitter buffer is configured to queue media from session participants for mixing by the application server during the group communication session;
   bypassing the received media from entry into the de-jitter buffer in response to determining the determined number does not exceed the threshold number during the predefined number of consecutive timeslots; and
   transmitting at least a portion of the received media to the communication group without mixing the at least a portion of the received media.

2. The method of claim 1, wherein the threshold number is 1, and bypassing the received media from entry into the de-jitter buffer comprises sending the non-silence media to a mixer for re-formatting.

3. The method of claim 1, wherein the predefined number of consecutive timeslots corresponds to more than one timeslot.

4. The method of claim 1, further comprising:
   adding the received media into the de-jitter buffer in response to determining the determined number exceeds the threshold number during the predefined number of consecutive timeslots;
   removing one or more frames of the received media from the de-jitter buffer; and
   mixing the one or more frames; and
   transmitting the mixed one or more frames to the communication group.

5. The method of claim 1, further comprising:
   formatting the portion of the received media that is to be transmitted to generate a formatted version of the received media, the formatted version of the received media conforming with an output stream transmitted by the application server to the communication group during the group communication session,
   wherein transmitting the at least a portion of the received media comprises transmitting the formatted version of the received media to the communication group.

6. The method of claim 5, wherein formatting comprises modifying a header-portion of the portion of the received media that is to be transmitted to conform with a header-portion associated with the output stream.

7. The method of claim 1, wherein transmitting the at least a portion of the received media comprises transmitting the at least a portion of the received media to each active session participant of the communication group except a respective session participant from which the received media is provided.

8. The method of claim 1, further comprising:
   transitioning between (i) adding media associated with the group communication session to the de-jitter buffer and (ii) bypassing media associated with the group communication session from entry into the de-jitter buffer, based upon a change to the number of session participants that are providing the non-silence media during the group communication session.

9. The method of claim 8, wherein the change corresponds to a decrease in the number of session participants providing the non-silence media, and transitioning comprises transitioning from (i) to (ii).

10. The method of claim 8, wherein the change corresponds to an increase in the number of session participants providing the non-silence media, and transitioning comprises transitioning from (ii) to (i).

11. The method of claim 1, further comprising:
removing queued media that is currently within the de-jitter buffer; and
transmitting the queued media to the communication group without mixing.

12. The method of claim 1, wherein the group communication session corresponds to a half-duplex communication session, a full-duplex communication session or a hybrid-duplex communication session that can have different numbers of floor-holders during the group communication session.

13. The method of claim 1, wherein the received media corresponds to one or more media frames that contain voice-media from the plurality of session participants.

14. An application server configured to arbitrate a group communication session for a communication group and to selectively mix media associated with the group communication session, comprising:
one or more processors coupled to at least one memory, configured to:
receiving media for a timeslot from a plurality of session participants sharing a floor of the group communication session for transmission to the communication group;
determining a number of session participants that are providing non-silence media;
determining whether to bypass the received media from entry into a de-jitter buffer based at least in part on whether the determined number exceeds a threshold number during a predefined number of consecutive timeslots, wherein the de-jitter buffer is configured to queue media from session participants for mixing by the application server during the group communication session;
bypassing the received media from entry into the de-jitter buffer in response to determining the determined number does not exceed the threshold number during the predefined number of consecutive timeslots; and
transmitting at least a portion of the received media to the communication group without mixing the at least a portion of the received media.

15. A system configured to arbitrate a group communication session for a communication group and to selectively mix media associated with the group communication session, comprising:
a distributed network of servers comprising:
at least one media control complex (MCC) comprising a controller connected to a de-jitter buffer and a mixer; and
at least one regional dispatcher,
wherein each controller comprises a processor configured with processor-executable instructions to perform processes comprising:
receiving media for a timeslot from a plurality of session participants of the group communication session for transmission to the communication group;
determining a number of session participants that are providing non-silence media;
determining whether to bypass the received media from entry into the de-jitter buffer based at least in part on whether the determined number exceeds a threshold number during a predefined number of consecutive timeslots, wherein the de-jitter buffer is configured to queue media from session participants for mixing during the group communication session;
bypassing the received media from entry into the de-jitter buffer in response to determining the determined number does not exceed the threshold number during the predefined number of consecutive timeslots; and
transmitting at least a portion of the received media to the communication group without mixing the at least a portion of the received media.

16. A non-transitory computer-readable storage medium having stored thereon computer-executable instructions, which, when executed by an application server configured to arbitrate a group communication session for a communication group and to selectively mix media associated with the group communication session, cause the application server to perform operations comprising:
receiving media for a timeslot from a plurality of session participants sharing a floor of the group communication session, for transmission to the communication group;
determining a number of session participants that are providing non-silence media;
determining whether to bypass the received media from entry into a de-jitter buffer based at least in part on whether the determined number exceeds a threshold number during a predefined number of consecutive timeslots, wherein the de-jitter buffer is configured to queue media from session participants for mixing by the application server during the group communication session;
bypassing the received media from entry into the de-jitter buffer in response to determining the determined number does not exceed the threshold number during the predefined number of consecutive timeslots; and
transmitting at least a portion of the received media to the communication group without mixing the at least a portion of the received media.

* * * * *